United States Patent [19]

Marquis et al.

[11] 3,800,039

[45] Mar. 26, 1974

[54] ANTITHROMBOGENIC PROCESS EMPLOYING SUBSTITUTED 6,7-DIALKOXYQUINAZOLINES

[75] Inventors: Norman R. Marquis; Roger L. Vigdahl, both of Evansville, Ind.

[73] Assignee: Mead Johnson & Company, Evansville, Ind.

[22] Filed: Oct. 21, 1970

[21] Appl. No.: 82,839

[52] U.S. Cl. .............................................. 424/251
[51] Int. Cl. .............................................. A61k 27/00
[58] Field of Search ................. 424/251; 260/251 Q

[56] References Cited
UNITED STATES PATENTS

| | | | |
|---|---|---|---|
| 3,248,292 | 4/1966 | Minielli | 260/251 Q |
| 3,517,005 | 6/1970 | Cronin | 260/256.4 |
| 3,631,035 | 12/1971 | Cox | 424/251 X |

OTHER PUBLICATIONS

Chem. Abs. Vol. 67, 1967, No. 31130e (2 pages).
Chem. Abs., Vol. 72, Feb. 16, 1970. No. 29987z.

*Primary Examiner*—Stanley J. Friedman
*Attorney, Agent, or Firm*—Robert E. Carnahan; Robert H. Uloth

[57] ABSTRACT

An antithrombogenic process is disclosed for the prevention of aggregation of blood platelets of a mammal subject to thromboembolic disease which comprises contacting a compound selected from a group of 2,4-substituted-6,7-dialkoxyquinazolines with the blood of the mammal. Illustrative of the 6,7-dialkoxyquinazolines which are useful in the antithrombogenic process of the present invention are 4-amino-6,7-dimethoxyquinazoline and 6,7-dimethoxy-4-ethylquinazoline.

13 Claims, No Drawings

ANTITHROMBOGENIC PROCESS EMPLOYING SUBSTITUTED 6,7-DIALKOXYQUINAZOLINES

BACKGROUND OF THE INVENTION

The subject of the present invention refers to drug and body treating compositions and is concerned with a method of preventing blood platelet aggregation employing a group of substituted quinazolines.

Platelet aggregation is considered to be part of a complex physiological mechanism of formation of thrombi in the vascular system. Thromboembolic phenomena, i.e., the formation of thrombi, is involved in hemostasis and a number of diseased states in mammals including thrombophlebitis, phlebothrombosis, cerebral thrombosis, coronary thrombosis and retinal vessel thrombosis. An increase in the propensity for platelet aggregation, sometimes referred to as platelet adhesiveness, is observed following parturition, in surgical operations, ischaemic heart disease, atherosclerosis, multiple sclerosis, intracranial tumors, thromboembolism, and hyperlipemia; refer to A. Poplawski et al., J. Atherosclerosis Research, 8, 721 (1968).

The substituted quinazolines of Formula I which are employed in the present invention differ both structurally and in their biological action from anticoagulant substances such as heparin and derivatives of coumarin and indandione. For instance, heparin does not inhibit the aggregation of blood platelets at dosages which prevent coagulation of the blood. Coumarin and indandione derivatives interfere with the synthesis of prothrombin in the liver which causes a decrease in thrombin formation thereby preventing the formation of fibrin (which causes blood to clot) from fibrinogen at dosages which have no effect on blood platelet aggregation. More recently the use of dipyridamole as an antithrombogenic agent has been described, refer to R. Eliasson and S. Bygdeman, Scand. J. Clin. Lab. Indvest., 24, 145 (1969).

Some of the 2,4-alkyl substituted quinazolines useful in the present invention have been disclosed by J. L. Minielli and H. C. Scarborough in U.S. Pat. No. 3,248,292 to be useful as bronchodilator, vasodilator, cardiac stimulant, and anit-inflammatory agents. However, it was not recognized until our discovery that the substances disclosed by Minielli et al. as well as other selected quinazolines effectively inhibit aggregation of blood platelets.

SUMMARY OF THE INVENTION

This invention is concerned with the use of compounds of the quinazoline class as inhibitors of blood platelet aggregation. In particular, the invention relates to the use of a group of substituted quinazolines characterized by Formula I and the non-toxic pharmaceutically acceptable salts thereof in the prevention of mammalian blood platelet aggregation. Prevention of blood platelet aggregation by the quinazolines is an activity also referred to herein an antithrombogenic activity. The quinazolines of Formula I are particularly useful in preventing blood platelet aggregation and are suitable for use in the treatment of mammals subject to thromboembolic diseases such as thrombophlebitis, phlebothrombosis, cerebral thrombosis, coronary thrombosis and retinal vessel thrombosis.

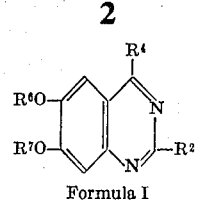

Formula I

It has been discovered that the substances which are characterized by Formula I effectively inhibit blood platelet aggregation in mammalian blood.

In Formula I, $R^2$ may be hydrogen or lower alkyl having from one to five carbon atoms inclusive. The substituent $R^4$ can be hydrogen, lower alkyl of from one to five carbon atoms inclusive, primary amino, and lower alkylamino from one to four carbon atoms inclusive. $R^4$ also may be lower alkoxy from one to four carbon atoms inclusive or cyano. Also $R^4$ is comprised of phenyl, benzyl, phenethyl, or halogen monosubstituted phenyl, benzyl, phenethyl wherein the halogen is chlorine, bromine, fluorine or iodine. $R^6$ and $R^7$ may be lower alkyl from one to five carbon atoms inclusive and also may be taken together in the form of $R^6O$ and $R^7O$ to form the methylenedioxy group. As used in this disclosure, the term "lower alkyl" and "lower alkoxy" comprehends both straight or branched chain hydrocarbon radicals such as methyl, ethyl, propyl, isopropyl, 1-butyl, 1-methylpropyl, 2-methylpropyl, tert.-butyl. In -dimethylpropyl, to these saturated hydrocarbon radicals, lower alkoxy and lower alkyl groups of five carbon atoms can include n-pentyl, 3-methylbutyl (isopentyl), 2,2-dimethylpropyl, 1-methylbutyl, 2-methylbutyl, 3-pentyl and the like.

A particularly preferred group of compounds useful as antithrombogenic agents comprises those of Formula I wherein $R^6$ and $R^7$ are limited to methyl or ethyl radicals while $R^2$ and $R^4$ are as defined above.

Another group of compounds which are effective antithrombogenic agents are those wherein $R^6$ and $R^7$ are methyl, $R^2$ is selected from the group consisting of hydrogen and methyl; and $R^4$ is selected from the group consisting of hydrogen, and lower alkyl of from one to five carbon atoms inclusive, cyano, primary amino, methylamino, and ethylamino.

A still further preferred group of compounds comprises those substances of Formula I wherein $R^6$ and $R^7$ are methyl, $R^2$ is hydrogen or methyl and $R^4$ is selected from the group consisting of hydrogen, cyano, primary amino, (lower) alkylamino and (lower) alkoxy.

Exemplary of substances of the present invention which can be employed as effective antithrombogenic agents are 6,7-dimethoxy-4-ethylquinazoline, 6,7-dimethoxyquinazoline, 6,7-dimethoxy-4-methylquinazoline, 6,7-dimethoxy-4-ethyl-2-methylquinazoline, 4-amino-6,7-dimethoxyquinazoline, 6,7-dimethoxy-4-methylaminoquinazoline hydrochloride and 4-benzyl-6,7-dimethoxyquinazoline.

Both 6,7-dimethoxyquinazoline and 2-methyl-6,7-dimethoxyquinazoline have been described in the literature, refer respectively to C. A. Fetscher, et al., J. Org. Chem. 4, 71 (1939), and A. Rilliet, Helv. Chim. Acta., 5, 547 (1922). According to United States Patent 3,248,292, these compounds are useful as bronchodilator, vasodilator, cardiac stimulant and anti-inflammatory agents.

U.S. Pat. No. 3,248,292 discloses a method of preparation of other 6,7-dialkoxy-quinazolines substituted in the 2 and 4 positions with either hydrogen or alkyl which are useful in the present invention. These 6,7-dialkoxy-quinazolines are obtained according to the reaction sequence outlined below. This method is applicable to those substituted quinazolines of Formula II wherein $R^2$, $R^6$ and $R^7$ are as defined above and "A" comprehends hydrogen, alkyl, phenyl, benzyl, phenethyl, halogen and monosubstituted phenyl, benzyl, and phenethyl.

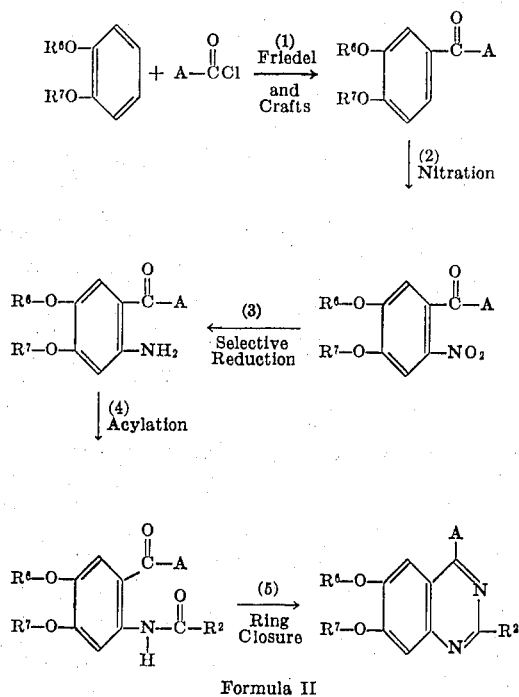

Formula II

Stage 1 involves acylation of veratrole, dialkoxy catechol ethers, or methylenedioxybenzene under Friedel and Crafts acylation conditions with an alkanoyl chloride having from one to six carbon atoms. The hydrocarbon residue of the alkanoyl chloride apart from the carbonyl function corresponds to the desired "A" substituent in Formula II. Acylation may also be carried out with benzoyl chloride or an aralkanoyl chloride.

Nitration of the resulting dialkoxyphenone in Stage 2 is carried out with nitric acid or a mixture of concentrated nitric and sulfuric acids, or other suitable aromatic nitration agents. The resulting 6-nitro-3,4-dialkoxyphenone is then selectively reduced in Stage 3 to the corresponding aminophenone. This reduction is carried out by catalytic or by chemical means. Acylation of the amino group in Stage 4 is conducted in conventional fashion well-known to those skilled in the art. For example, treating the intermediate from Stage 3 with formic acid or a mixture of formic acid and acetic anhydride introduces the N-formyl group when the $R^2$ substituent is hydrogen. When $R^2$ is alkyl, the appropriate acyl halide or anhydride can be used. At Stage 5, ring closure is carried out when $R^2$ is hydrogen by heating the 3,4-dialkoxy-6-formamidophenone with ammonia in molten ammonium formate.

If an alkyl substituent having from one to five carbon atoms inclusive is desired for $R^2$, the 6-aminophenone from Stage 3 is acrylated in Stage 4 with the anhydride or acid halide of an alkanoic acid having two to six carbon atoms. At Stage 5, ring closure is conducted by heating the acylaminophenones from Stage 4 with ammonia in molten ammonium acetate or molten ammonium salt of the acid corresponding to the acylating agent employed in Stage 4.

When $R^6O$ and $R^7O$ together constitute the methylenedioxy group, 6-aminopiperonal or a 3,4-methylenedioxy-6-aminophenone is treated as indicated in Stages 4 and 5.

The compounds of Formula I wherein the $R^4$ substituent is primary amino or (lower) alkylamino or (lower) alkoxy or cyano are prepared by reaction of the appropriately substituted 4-chloro-6,7-dialkoxyquinazolines with ammonia, alkylamino, an alkali metal alkoxide or sodium cyanide in an inert solvent such as methanol, ethanol, dimethylformamide, dioxane, phenol, tetrahydrofuran, acetone and the like. 4-Chloro-6,7-dialkoxyquinazolines are obtained from 3,4-dialkoxybenzoic acid esters as follows. The esters are nitrated to form 3,4-dialkoxy-6-nitrobenzoates and the nitro reduced providing 3,4-dialkoxy-6-aminobenzoates. The 3,4-dialkoxy-6-aminobenzoic acid esters are cyclized by treating with molten formamide to provide 6,7-dialkoxy-4(3H)-quinazolinones. Chlorination of 6,7-dialkoxy-4(3H)-quinazolinones with phosphorus oxychloride provides the 4-chloro-6,7-dialkoxyquinazolines such as
4-chloro-6,7-dimethoxyquinazoline,
4-chloro-6,7-diethoxyquinazoline,
4-chloro-6,7-dipropyloxyquinazoline,
4-chloro-6,7-diisopropyloxyquinazoline,
4-chloro-6,7-dibutoxyquinazoline,
4-chloro-6,7-dipentoxyquinazoline.

Similarly, reaction of 2-alkyl-6,7-dialkoxy-4(3H)-quinazolinones with phosphorus oxychloride provides 2-alkyl-4-chloro-6,7-dialkoxyquinazolines such as
4-chloro-6,7-dimethoxy-2-n-propylquinazoline,
4-chloro-6,7-dimethoxy-2-ethylquinazoline,
4-chloro-6,7-dimethoxy-2-methylquinazoline,
4-chloro-6,7-diethoxyquinazoline,
4-chloro-6,7-methylenedioxyquinazoline,
4-chloro-6,7-methylenedioxy-2-methylquinazoline,
4-chloro-6,7-dipropyloxy-2-ethylquinazoline,
4-chloro-6,7-diisobutoxy-2-methylquinazoline,
4-chloro-6,7-dipropyloxy-2-isobutylquinazoline,
4-chloro-6,7-dimethoxy-2-isobutylquinazoline,
4-chloro-6,7-diisopropyloxy-2-isobutylquinazoline,
4-chloro-6,7-dipropyloxyquinazoline,
4-chloro-6,7-dimethoxy-2-isopropylquinazoline,
4-chloro-6,7-dimethoxy-2-tert.-butylquinazoline.

The reaction sequence for 4-amino-6,7-dimethoxyquinazoline is as follows:

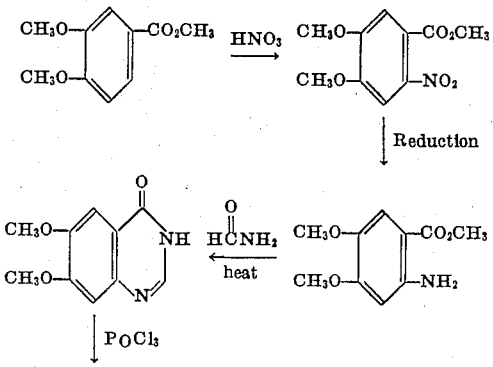

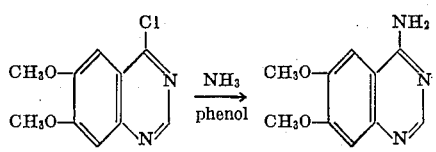

An R[2] substituted-6,7-dialkoxyquinazoline of Formula I wherein R[2] is as defined above and R[4] is hydrogen can be prepared by reductive dehalogenation of the corresponding 2-R[2]-4-chloro-6,7-dialkoxyquinazoline to the corresponding R[2]-substituted -6,7-dialkoxy-3,4-dihydroquinazoline which in turn is oxidized to the desired R[2]-substituted-6,7-dialkoxyquinazoline with potassium ferricyanide. Alternatively, the reductive dehalogenation may be stopped before the 3,4-dihydroquinazoline is formed thereby eliminating the oxidizing step.

As used herein, the term "non-toxic pharmaceutically acceptable acid solution salts" refers to salts of quinazolines of Formula I with relatively non-toxic inorganic or organic acids. Illustrative of non-toxic pharmaceutically acceptable acid addition salts of 6,7-dialkoxyquinazolines of Formula I are the salts of the variety of inorganic or organic acids such as sulfuric, phosphoric, hydrochloric, hydrobromic, hydroiodic, sulfamic, acetic, lactic, malic, succinic, maleic, fumaric, tartaric, citric, gluconic, glutaric, ascorbic, benzoic, cinnamic and related acids.

Preparation of pharmaceutically acceptable acid addition salts of the quinazolines of Formula I is accomplished by admixture of the quinazoline bases with at least one chemical equivalent of any of the various acids hereinabove defined. Generally, the salts are prepared in an inert solvent such as water, ether, benzene, ethanol, ethyl acetate and the like.

The antithrombogenic activity of the quinazolines of Formula I with which this invention is concerned is evaluated according to a method described by Born, Nature, 194, 927 (1962) and O'Brien, J. Clin. Path., 15, 446 (1962). The method is essentially a nephelometric one in which the change of turbidity of a specimen of platelet rich blood plasma (human) is measured on causation of platelet aggregation by addition of a thrombogenic inducing agent such as adenosine-5'-diphosphate. In this test, dipyridamole has an $ED_{50}$ of 210 microgram per 0.5 ml. of platelet rich plasma while the $ED_{50}$ of the anticoagulant heparin is greater than 1,000 microgram per 0.5 ml. of platelet rich plasma.

The process of the present invention for preventing aggregation of blood platelets in mammalian blood is carried out by contacting the substances of Formula I at a dosage ranging from about 0.5 to 80 micrograms of the quinazoline of Formula I per 0.5 milliliter of mammalian blood. In the intact mammal, this is accomplished by intravenous injection of the substances of Formula I or by other forms of parenteral administration. The antithrombogenic process may also be carried out by oral administration of the quinazolines of Formula I to the mammalian host where they are then rapidly absorbed in the blood stream to provide an effective antithrombogenic concentration therein. The antithrombogenic process of the present invention can be used prophylactically in the treatment of thrombosis in thromboembolic disease.

Formula I quinazolines may be administered for antithrombogenic purposes formulated as tablets, capsules, elixirs, solutions, suspensions, etc. Unit doses range from about 5 to 500 mg.

The following examples are given in order to illustrate the invention and are not to be construed as limiting it to such examples.

EXAMPLES OF SPECIFIC EMBODIMENTS
EXAMPLES 1–48

The effectiveness of the quinazolines of Formula I in the process of the present invention for preventing aggregation of blood platelets can be demonstrated in a modification of the Born (supra) and O'Brien (supra) method which is more fully described below.

Platelet rich plasma prepared from human blood is added to a 0.312 inch diameter cell containing a teflon coated stirring bar. This cell is placed into a block heated to 37°C. of a Chrono-log aggregometer containing a magnetic stirrer. The platelet rich plasma is stirred during the entire procedure and the turbidimetric changes occurring during the test are recorded with a Lineal-Log Lineal-Log recorder. After a 2 minute preincubation period, the quinazoline which is to be evaluated is added. After several more minutes, adenosine-5'-diphosphate, collagen or epinephrine are added and the response noted. The recording obtained from aggregation of platelets which results in an increase in transmittance, is due to the clumping of platelets thus permitting passage of more light through the suspension. Efficacy of the compound as an antithrombogenic agent is determined by its ability to prevent this increase in transmittance which is completely dependent upon platelet aggregation. Various doses of the substance which is being tested are administered and an effective dose ($ED_{50}$) preventing a 50 percent increase in transmittance is determined.

According to this test, selected quinazolines which are representative of the quinazolines of Formula I have the following antithrombogenic activity. The $ED_{50}$ values indicate the concentration in microgram of the test agent per 0.5 ml. of platelet rich plasma which will cause a 50 percent reduction in platelet aggregation induced by 1 microgram of adenosine-5'-diphosphate.

| Example No. | Quinazoline | $ED_{50}$ (mcg./0.5 ml.) of platelet rich plasma |
|---|---|---|
| 1 | 6,7-Dimethoxy-4-ethylquinazoline | 11 |
| 2 | 4-Cyanoquinazoline | 14 |
| 3 | 4-Amino-6,7-dimethoxyquinazoline | 7 |
| 4 | 6,7-Dimethoxy-4-methylaminoquinaoline hydrochloride | 13 |
| 5 | 4-Benzyl-6,7-dimethoxyquinazoline | 14 |

Other examples of quinazolines of Formula I useful in the antithrombogenic process of the present invention as demonstrated by the Born and O'Brien test (supra) are listed below.

| Example No. | Quinazoline |
|---|---|
| 6 | 6,7-Dimethoxy-4-methylquinazoline |
| 7 | 6,7-Dimethoxy-4-isopentyl-2-methylquinazoline |
| 8 | 6,7-Diisobutoxy-4-methylaminoquinazoline |
| 9 | 6,7-Dimethoxyquinazoline |

-Continued

| Example No. | Quinazoline |
|---|---|
| 10 | 6,7-Diethoxy-2-methyl-4-isopentylquinazoline |
| 11 | 2-Methyl-6,7-methylenedioxyquinazoline |
| 12 | 4-Methyl-6,7-methylenedioxyquinazoline |
| 13 | 6,7-Dimethoxy-4-propylquinazoline |
| 14 | 6,7-Dimethoxy-2-methyl-4-propylquinazoline |
| 15 | 6,7-Dimethoxy-4-isopropylquinazoline |
| 16 | 6,7-Dimethoxy-4-isopentylquinazoline |
| 17 | 6,7-Dimethoxy-4-ethyl-2-methylquinazoline |
| 18 | 6,7-Dimethoxy-4-isopropyl-2-methylquinazoline |
| 19 | 6,7-Dimethoxy-2,4-dipropylquinazoline hydrochloride |
| 20 | 6,7-Dimethoxy-4-methylquinazoline |
| 21 | 6,7-Dimethoxy-2,4-dimethylquinazoline |
| 22 | 6,7-Dimethoxy-4-ethylquinazoline |
| 23 | 6,7-Dimethoxy-4-phenylquinazoline |
| 24 | 4-Benzyl-6,7-dimethoxyquinazoline |
| 25 | 6,7-Dimethoxy-4-(2-phenethyl)quinazoline |
| 26 | 6,7-Dimethoxy-2-methyl-4-phenylquinazoline |
| 27 | 4-(4-Chlorobenzyl)-6,7-dimethoxyquinazoline |
| 28 | 6,7-Dimethoxy-2-isopentylquinazoline |
| 29 | 6,7-Dimethoxy-4-(4-bromophenyl)-2-n-butyl-quinazoline |
| 30 | 6,7-Dipropyloxy-2-ethylquinazoline |
| 31 | 6,7-Diisobutyloxy-2-methylquinazoline |
| 32 | 4,6,7-Trimethoxyquinazoline |
| 33 | 4,6,7-Trimethoxy-2-methylquinazoline |
| 34 | 6,7-Dipropyloxy-2-isobutyl-4-methoxyquinazoline |
| 35 | 6,7-Dimethoxy-4-isopentoxy-2-methylquinazoline |
| 36 | 6,7-Dimethoxy-4-cyano-2-methylquinazoline |
| 37 | 6,7-Dimethoxy-4-cyano-2-isobutylquinazoline |
| 38 | 6,7-Diisopropyloxy-4-cyano-2-isobutylquinazoline |
| 39 | 6,7-Dimethoxy-4-n-butylaminoquinazoline |
| 40 | 6,7-Dipropyloxy-4-aminoquinazoline |
| 41 | 6,7-Dimethoxy-4-amino-2-ethylquinazoline |
| 42 | 6,7-Dimethoxy-4-amino-2-n-propylquinazoline |
| 43 | 6,7-Dimethoxy-4-amino-2-isopropylquinazoline |
| 44 | 6,7-Dimethoxy-4-amino-2-tert.-butylquinazoline |
| 45 | 4-Amino-6,7-methylenedioxyquinazoline |
| 46 | 4-n-Propylamino-6,7-methylenedioxyquinazoline |

Example 47. Oral Administration of 6,7-dimethoxy-4-ethylquinazoline.- 6,7-Dimethoxy-4-ethylquinazoline, at a dose of 150 mg./kg. body weight, is orally administered to each rat of a group of 5 rats. Another group of rats receive saline and serves as a control. The animals are anesthetized and a 4 ml. portion of blood is drawn within 0 to 1 min. after dosing and at 2 and 4 hour periods thereafter. The blood of the rats from their respective groups are pooled and platelet rich plasma is prepared from the blood by centrifugation at 200 times gravity for 20 min. at room temperature. Samples (0.5 ml.) of platelet rich plasma from the control and treated rats are tested for their ability to aggregate with either collagen or adenosine-5'-diphosphate are added as specified in the modification of Born and O'Brien method which has been fully described above. The results shown below indicate that 6-,7-dimethoxy-4-ethylquinazoline effectively inhibits blood platelet aggregation induced by collagen or adenosine-5'-diphosphate.

| Concentration of blood platelet inducing agent per 0.5 ml. platelet rich plasma | % Inhibition of Blood Platelet Aggregation at Time* | | |
|---|---|---|---|
| | 0.1 min. | 2 hr. | 4 hr. |
| 30 microgram collagen | 3.8 | 91 | 90 |
| 0.25 microgram adenosine-5'-diphosphate | 0 | 64 | 54 |

* Compared to control group of saline treated rats

Synthetic methods of preparation of the quinazolines of Formula I are described below in order that these substances should be readily available to those persons desiring to practice the antithrombogenic process of the present invention. The number in parenthesis following the procedure number corresponds to the example number of those quinazolines listed hereinabove.

Procedure 1 (6).
6,7-Dimethoxy-4-methylquinazoline.—

Ammonium formate, 250 g. and 15.1 g. (0.068 mole) of 3,4-dimethoxy-6-formamidoacetophenone is placed in a 500 ml. three-necked round-bottomed flask equipped with a power stirrer and sintered glass gas addition tube. The flask is heated in an oil bath which is maintained at a temperature of 165°-170°C. After the reactants have melted, the stirrer is started and a rapid stream of ammonia is passed through the reaction mixture by means of the gas addition tube. After 4 hrs., of treatment in this fashion, the hot solution is quenched in water and then made basic by treatment with ammonium hydroxide and extracted with six 100 ml. portions of chloroform. The combined chloroform extracts are dried over anhydrous magnesium sulfate and the dried solvent removed by evaporation. The residue is recrystallized from acetonitrile and then twice recrystallized from ethyl acetate yielding 5.3 g. of analytically pure product (38 percent yield), m.p. 150°-152°C.

Intermediates for Procedure 1.

A. 3,4-Dimethoxy-6-nitroacetophenone.— A mixture of 350 ml. of nitric acid (sp. gr. 1.42) and 150 ml. of sulfuric acid (sp. gr. 1.84) is cooled to −5°C. and 100 g. (0.56 mole) of powdered 3,4-dimethoxyacetophenone which is prepared according to J. C. E. Simpson, J. Chem. Soc. 94, (1946), is added thereto in small portions with stirring and cooling to maintain the temperature at about −5°C. The solution is then stirred for 30 min. and poured into 1 liter of cold water. The product precipitates as a solid which is collected by filtration, washed with water, and recrystallized without drying from ethanol; yield 107 g. (85 percent), m.p. 133°-135°C.

B. 3,4-Dimethoxy-6-aminoacetophenone.— The nitro compound of Procedure 1 (A), 22.5 g. (0.1 mole), 200 ml. of tetrahydrofuran, and 0.1 g. of platinum oxide is agitated in an atmosphere of hydrogen at an initial pressure of 60 p.s.i.g. until three molecular proportions of hydrogen have been absorbed. Approximately 4 hr. is required. The catalyst is then removed by filtration and the solvent evaporated at reduced pressure. The residue is then recrystallized from diisopropyl ether, yielding the desired product, 46 percent yield, m.p. 99°-102°C.

C. 3,4-Dimethoxy-6-formamidoacetophenone.— A mixture of 40 ml. of formic acid (98-100 percent pure) and 80 ml. of acetic anhydride is prepared by cautiously mixing the two reagents with cooling. The mixture is then stirred and 0.12 mole of 3,4-dimethoxy-6-aminoacetophenone is added in one portion. The solution is stirred for 10 min. and then diluted with an equal volume of water. This step is carried out with cooling of the reaction vessel with ice water. The suspension of precipitated product is then thoroughly chilled, and the product collected by filtration and recrystallized from ethyl acetate, yield 83 percent, m.p. 165°-167°C.

Procedure 2 (7). 6,7-Dimethoxy-4-isopentyl-2-methylquinazoline.— 3',4'-Dimethoxy-6'-acetamido-4-methyl-pentanophenone, 15.7 g., and 150 g. of ammonium acetate are mixed in a round bottomed flask and heated until liquification takes place. An oil bath maintained at 160°–165°C. is adequate for this purpose. Ammonia gas is passed into the liquid melt with stirring for a period of 2 hr. while heating as above. The molten mixture is then poured into 1 liter of water and aqeuous mixture treated with sufficient sodium hydroxide to adjust it to an alkaline pH. The precipitated material is then removed by extraction with chloroform and recovered from the extract by evaporation of the solvent. The solid residue so obtained is recrystallized from heptane, yielding light yellow colored needles weighing 7.1 g., m.p. 89.5°–90.5°C.

Intermediates for Procedure 2.

A. 3′,4′-Dimethoxy-4-methylpentanophenone.— A solution of 100 g. (0.72 mole) of veratrole in 500 ml. of methylene chloride is chilled in a reaction flask equipped with stirrer, reflux condenser, and dropping funnel. The reaction mixture is protected from the air by employing a nitrogen atmosphere in the reaction vessel. Aluminum chloride, 107 g. (0.18 mole) is added to this solution in portions. A solution of 100 g. (0.74 mole) of isocaproyl chloride in 100 ml. of methylene chloride is then added in portions during a period of about 30 min. The mixture is refluxed for 1.5 hr. It is then chilled in an ice bath and the precipitated aluminum salt complex hydrolyzed by the gradual addition of 400 ml. of 15 percent hydrochloric acid. Sufficient water is then added to dissolve the precipitated aluminum salts and the methylene chloride layer separated. It is thoroughly washed, dried over anhydrous magnesium sulfate and the solvent distilled. The residual oil is then distilled in vacuo, yielding the desired product as distillate; 129°–133°C./0.025 mm. Hg., $n_D^{25}$ 1.5337.

B. 3′,4′-Dimethoxy-6′-nitro-4-methylpentanophenone.— The product of Procedure 2 (A), 96 g. (0.41 mole) is added to 1 l. of cooled 69 percent nitric acid at 10°C. The mixture is then stirred for about 20 min. at room temperature and poured into several liters of water. The product separates from solution and is recovered by extraction with methylene chloride. Removal of the solvent by distillation yields the desired intermediate as a residue which is recrystalized from aqueous ethanol after treatment with decolorizing charcoal, yield 67 g., m.p. 76°–79°C.

C. 3′,4′-Dimethoxy-6′-acetamido-4-methylpentanophenone.— The nitro compound of Procedure 2 (B), 11.5 g. (0.04 mole) is dissolved in 80 ml. of tetrahydrofuran and reduced with hydrogen at an initial pressure of 60 p.s.i.g. employing 0.1 g. of platinum oxide to supply the catalyst. The calculated quantity of hydrogen is absorbed in about 4 hr. The product is recovered by filtration of the catalyst and evaporation of the filtrate. The crude amino compound so obtained as a yellow oil is treated with 8 ml. of acetic anhydride resulting in transformation thereof into a solid mass of crystalline material. The solid is dissolved in ethanol with warming and the ethanolic solution allowed to cool with the formation of a yellow crystalline solid. This material is recrystallized from a mixture of water and methanol yielding the product as white crystalline needles, m.p. 97°–99°C.

Procedure 3 (3). 4-Amino-6,7-dimethoxyquinazoline.— A three neck round bottom flask equipped with a stirrer reflux condenser, and gas inlet tube is charged with 4-chloro-6,7-dimethoxyquinazoline (8.7 g., 0.039 mole) and 80 g. of phenol. The mixture is refluxed while a stream of gaseous ammonia is bubbled therethrough with vigorous stirring for 2.5 hr. The reaction mixture is poured into 300 ml. of water and made strongly basic with 40 percent sodium hydroxide. On cooling at 10°C., the product crystallizes from the mixture and is collected. Purification of the product is carried out by crystallization from acetonitrile, yield 4.45 g. of analytically pure 4-amino-6,7-dimethoxyquinazoline, m.p. 207°–209°C. (corr.).

Intermediates for Procedure 3.

A. Methyl-3,4-dimethoxybenzoate.— Hydrogen chloride is bubbled through a mixture of 3,4-dimethoxybenzic acid (200 g., 1.1 mole) prepared according to the method of R. Arnold and F. Bordwell, J. Am. Chem. Soc., 64, 2983 (1942), in 1.5 liter of absolute methanol until the suspended acid dissolves. The solution is cooled in ice and saturated with hydrogen chloride. After 16 hr. at room temperature, the methanolic solution is filtered and the filtrate concentrated in vacuo to about 800 ml. and then poured into 300 ml. of ice water. The crude methyl ester precipitates and is collected and washed with 2 liter of cold water. Crystallization of the washed material from methanol-water yields 206 g. (95 percent) of methyl-3,4-dimethoxybenzoate, m.p. 57°–59°C.

B. Methyl-3,4-dimethoxy-6-nitrobenzoate.— Methyl-3,4-dimethoxybenzoate (115 g., 0.59 mole) is dissolved in 250 ml. of glacial acetic acid. A chilled solution of 500 ml. of red fuming nitric acid (d. 1.59) and 250 ml. of glacial acetic acid is added dropwise to the stirred mixture at a temperature below 10°C. After the addition is completed the reaction mixture is stirred for 2 hr. at 10°C. and then poured into 1.5 liter of cold water. The nitrated product crystallizes from this mixture and is collected and washed with water. Crystallization of the washed material from N,N-dimethylformamide provides 110 g. (83 percent) of methyl-3,4-dimethoxy-6-nitrobenzoate, m.p. 141°–144°C.

C. Methyl-6-amino-3,4-dimethoxybenzoate.— A mixture of methyl-3,4-dimethoxy-6-nitrobenzoate (24.1 g., 0.1 mole) in 200 ml. of tetrahydrofuran is reduced under an atmosphere of hydrogen employing 0.2 g. of platinum oxide catalyst. When the reduction is completed, the catalyst is collected and the filtrate concentrated at reduced pressure. The resulting residue is crystallized from ethyl acetate and yields 17.6 g., (82 percent) of methyl-6-amino-3,4-dimethoxybenzoate, m.p. 125°–127°C.

D. 6,7-Dimethoxy-4(3H)-quinazolinone.— A mixture of methyl-6-amino-3,4-dimethoxybenzoate (161.2 g., 0.765 mole) and formamide (104 g., 2.3 mole) is heated in an open flask at 135°C. for 45 min. and then at 185°C. for 8 hr. The cooled mixture is triturated with ethanol and filtered. The filter-cake comprises 109 g. of the crude quinazolinone which is illustrated from N-methyl-2-pyrrolodinone to provide 6,7-dimethoxy-4-(3H)-quinazolinone, yield 98.6 g. (62 percent), m.p. 297°–299°C.

E. 4-Chloro-6,7-dimethoxyquinazoline.— A mixture of 6,7-dimethoxy-4(3H)-quinazoline (50.0 g., 0.24 mole), phosphorus oxychloride (25.0 g., 0.16 mole) and N,N-diethylaniline (72.5 g., 0.49 mole) in 150 ml. of toluene is refluxed for 4 hr. The hot mixture is filtered and the filtrate chilled; the crude product precipitates therefrom and is collected and crystallized from butanone yielding 36.1 g. (66 percent) of 4-chloro-6,7-dimethoxyquinazoline, m.p. 179°–183°C.

Analysis. Calcd. for $C_{10}H_9ClN_2O_2$: C, 53,46; H, 4.04; N, 12,47. Found: C, 53.48; H, 4.11; N, 12.30.

Procedure 4 (4).

6,7-Dimethoxy-4-methylamino-quinazoline hydrochloride. — 4-Chloro-6,7-dimethoxyquinazoline (5.0 g., 0.022 mole) is added to 5 ml. of methylamine in 100 ml. of absolute ethanol. The mixture is stirred at room temperature for 16 hr. and then filtered. Concentration of the filtrate provides an oily residue which is taken up in water. Acidification of the aqueous solution with concentrated hydrochloric acid provides a solid precipitate which is collected. Crystallization of this material from ethanol-water provides analytically pure 6,7-dimethoxy-4-methylaminoquinazoline hydrochloride, m.p. 256°–257.5°C. (dec.) (corr.)

Procedure 5 (8).

6,7-Diisobutoxy-4-methylamino-quinazoline.—

To a mixture of 20 g. of methylamine in 300 ml. of absolute ethanol 4-chloro-6,7-diisobutoxyquinazoline (13.9 g., 0.045 mole) is added. The mixture is stirred for 16 hr., filtered and the filtrate concentrated in vacuo. The resulting residue triturated with isopropyl ether provides 9.1 g. of material, m.p. 258°–260°C. (dec.). This material is taken up in water and made basic with IN sodium hydroxide affording the solid free base which is collected. Crystallization from acetonitrile yields analytically pure 6,7-diisobutyoxy-4-methylaminoquinazoline, m.p. 205°–207°C. (corr.).

Intermediates for Procedure 5.

A. Ethyl-3,4-diisobutoxybenzoate.—

1-Bromo-2-methylpropane (164.4 g., 1.2 mole) is added to a mixture of ethyl-3,4-dihydroxybenzoate (54.6 g., 0.3 mole), 166 g. of potassium carbonate and 1 g. of potassium iodide in 150 ml. of dimethylsulfoxide. This mixture is heated at 75°C. for 4 hr., cooled and diluted with about 3 liters of water. The aqueous mixture is extracted with ethyl acetate and the ethyl acetate extract first washed with IN sodium hydroxide and then water. The washed ethyl acetate extract is concentrated in vacuo and the resulting residue stirred with water and filtered provides 82.3 g. of ethyl-3,4-diisobutoxy-benzoate, m.p. 56°–58°C. Analytically pure material is obtained by recrystallization from 2-propanol-water and has a melting point of 60°–61°C.

Analysis. Carbon, 69.11; H, 8.93.

B. Ethyl-6-nitro-3,4-diisobutoxybenzoate.—

Ethyl-3,4-diisobutyoxybenzoate (29.4 g., 0.1 mole) is dissolved in 100 ml. of acetic acid. Concentrated nitric acid (50 ml.) is added dropwise to the stirred mixture at about 15°C. in 20 minutes. After addition is completed the reaction mixture is stirred for 3 hr. at room temperature and then poured into about 1 liter of ice and water. This mixture is extracted with ethyl acetate. The combined extracts are successively washed with water, aqueous sodium carbonate until the washings are a pH 8, water, and then dried over magnesium sulfate. The dried ethyl acetate solution is concentrated in vacuo providing 38.0 g. of oily residue. This residue is passed through an acid washed alumina column employing first petroleum ether (b.p. 30°–60°C.) and then chloroform as the eluent. The combined effluents, on concentration, provide 26 g. of yellow oil (75 percent) which comprises ethyl-6-nitro-3,4-diisobutoxybenzoate sufficiently pure for further reaction.

C. Ethyl-6-amino-3,4-diisobutoxybenzoate.—

Reduction of ethyl-6-nitro-3,4-diisobutoxybenzoate (71 g.) in 500 ml. of ethanol is carried out in a Parr apparatus employing 10 percent palladium on carbon catalyst. During the reduction, the reduced material precipitates from the ethanolic solution and it is preferred to keep the ethanolic solution warm to maintain solution. When the reduction is complete, the hot solution is filtered and the filtrate cooled to provide 38.0 g. of ethyl-6-amino-3,4-diisobutoxy-benzoate having a melting point of 101°–104°C.

Treating a portion of ethyl-6-amino-3,4-diisobutoxybenzoate with ethanolic hydrogen chloride in isopropyl ether provides the hydrochloride salt which crystallized from methanol-isopropyl ether yields analytically pure ethyl-6-amino-3,4-diisobutoxybenzoate hydrochloride, m.p. 180°–183°C.

Analysis. Calcd. for $C_{17}H_{27}NO_4$: C, 59.03; 8.16;

N, 4.05. Found: C, 58.99; H, 8.09; N, 4.30.

D. 6,7-Diisobutoxy-4(3H)-quinazolinone.—

A mixture of ethyl-6-amino-3,4-diisobutoxybenzoate (15.3 g., 0.05 mole) and 30 ml. of formamide (0.75 mole) is heated at 120°–125°C. for 2 hr. and then at 180°–185°C. for 4 hr. The cooled reacted mixture is triturated with water, filtered, and washed with water. Crystallization of the filter cake from ethanol-water provides 11.4 g. (79 percent) of 6,7-diisobutoxy-4(3H)-quinazolinone, m.p. 212°–214°C.

E. 4-Chloro-6,7-diisobutoxyquinazoline.—

A mixture of 6,7-diisobutoxy-4(3H)-quinazolinone (18.9 g., 0.065 mole), N,N-diethylaniline (16 ml., 0.1 mole), phosphorus oxychloride (20 g., 0.13 mole) in 500 ml. of toluene is refluxed with stirring for 1 hr. The mixture is concentrated in vacuo and the residue diluted with toluene and reconcentrated. The resulting residue is taken up in benzene, washed with water, and the benzene solution dried over magnesium sulfate. The benzene solvent is evaporated and the residue is crystallized from heptane yielding 14.0 g. (70 percent) of analytically pure 4-chloro-6,7-diisobutoxyquinazoline.

Analysis. Calcd. for $C_{16}H_{21}ClN_2O_2$: C, 62.22; H, 6.85; N, 9.07. Found: C, 62.07; H, 6.81; N, 9.04.

Procedure 6 (32). 4,6,7-Trimethoxyquinazoline.—

A mixture of sodium methoxide (0.1 mole) and 4-chloro-6,7-dimethoxyquinazoline (0.1 mole) in 150 ml. of methanol is refluxed for 8 hr. and then concentrated in vacuo. The resulting residue is triturated with water to remove the sodium chloride providing 4,6,7-trimethoxyquinazoline.

Procedure 7 (9). 6,7-Dimethoxyquinazoline. —

Reductive dehalogenation of 6,7-dimethoxy-4-chloroquinazoline (9.7 g., 0.0433 mole) in 200 ml. of absolute methanol with 3.56 g. of sodium acetate (0.433 mole) employing 2 g. of 10 percent palladium on carbon catalyst is carried out in a Parr apparatus. After the reduction is complete, the reaction mixture is filtered and the filtrate concentrated in vacuo providing a 6,7-dimethoxy-3,4-dihydroquinazoline intermediate. This intermediate is oxidized by dissolving in 200 ml. of water, adding 40 ml. of 33 percent hydroxide followed by a solution of 31.4 g. of potassium ferricyanide in 160 ml. of water. After stirring for 5 min., the solution is made basic with 200 ml. of 33 percent potassium hydroxide and is extracted with ether. Evaporation of the ether extracts and crystallization of the residue first from ethyl acetate and then from butanone provides analytically pure 6,7-dimethoxyquinazoline, m.p. 146.5°–148°C.

A procedure whereby the oxidizing step is omitted is as follows:

A mixture of 4-chloro-6,7-dimethoxyquinazoline (36.1 g., 0.16 mole) in 1,000 ml. of benzene is placed in a 4 liter reducing flask. A 5.0 gram portion of 10 percent palladium on carbon catalyst is added to this mixture followed by a solution of anhydrous sodium acetate (19.6 g., 0.24 mole) in 450 ml. of methanol. The reductive dehalogenation is carried out under an atmosphere of hydrogen. The reduction is stopped after 0.16 mole of hydrogen is taken up and the solids are collected and the filtrate evaporated under reduced pressure. The resulting residue is dissolved in 200 ml. of water and made basic with 50 ml. of 28 percent aqueous ammonia. This solution is extracted with six 50 ml. portions of chloroform and the combined chloroform extracts dried over magnesium sulfate and then evaporated in vacuo. This provides a solid residue consisting of 6,7-dimethoxyquinazoline which is crystallized from butanone to provide 22.4 g. (74 percent) of material having a melting point of 146°–149°C.

Procedure 8 (2). 4-Cyanoquinazoline.—

The preparation of 4-cyanoquinazoline has been described by T. Higashino, Yakugaku Zasshi; 80, 245 (1960), refer to Chem. Abst., 54, 13125 (1960).

Another method of preparation involves the reaction of equimolar portions of 4-chloroquinazoline with sodium cyanide in dimethylformamide. The reaction mixture is quenched in water and then extracted with chloroform. Evaporation of the chloroform extract provides 4-cyanoquinazoline.

The 6,7-dialkoxyquinazolines listed in Table I are prepared from the specified reactants according to methods described in Procedures 1–8 as will be clear to those skilled in the art.

TABLE I

Additional Quinazolines Prepared by Adaptation of Procedures 1 to 8 and Reactants Therefor

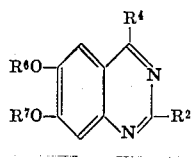

| Procedure | Ex. No. Reference | $R^2$ | $R^4$ | $R^6$ | $R^7$ | Reactants |
|---|---|---|---|---|---|---|
| 9 | (10) | $CH_3$ | $(CH_3)_2CHCH_2CH_2C_2H_5$ | | $C_2H_5$ | Catechol diethyl ether, isocaproyl chloride, acetic anhydride |
| 10 | (11) | $CH_3$ | H | methylenedioxy | | 6-Aminopiperonal, acetic anhydride |
| 11 | (12) | H | $CH_3$ | methylenedioxy | | 1,2-Methlenedioxyphenyl, acetyl chloride, formic acid–acetic anhydride |
| 12 | (13) | H | $CH_3CH_2CH_2$ | $CH_3$ | $CH_3$ | Veratrole, butyryl chloride, formic acid-acetic anhydride |
| 13 | (14) | $CH_3$ | $CH_3CH_2CH_2$ | $CH_3$ | $CH_3$ | Veratrole, butyryl chloride, acetic anhydride |
| 14 | (15) | H | $(CH_3)_2CH$ | $CH_3$ | $CH_3$ | Veratrole, isobutyryl chloride, formic acid-acetic anhydride |
| 15 | (16) | H | $(CH_3)_2CHCH_2CH_2$ | $CH_3$ | $CH_3$ | Veratrole, isocaproyl chloride, formic acid–acetate anhydride |
| 16 | (17) | $CH_3$ | $CH_3CH_2$ | $CH_3$ | $CH_3$ | Veratrole, propionyl chloride, acetic anhydride |
| 17 | (18) | $CH_3$ | $(CH_3)_2CH$ | $CH_3$ | $CH_3$ | Veratrole, isobutyryl chloride, acetic anhydride |
| 18 | (19) | $CH_3CH_2CH_2$ | $CH_3CH_2CH_2$ | $CH_3$ | $CH_3$ | Veratrole, butyryl chloride, butyric anhydride |
| 19 | (20) | H | $CH_3$ | $C_2H_5$ | $C_2H_5$ | Catechol diethyl ether, acetyl chloride, formic acid acetic anhydride |
| 20 | (21) | $CH_3$ | $CH_3$ | $CH_3$ | $CH_3$ | Veratrole, acetyl chloride, acetic anhydride |
| 21 | (22) | H | $C_2H_5$ | $CH_3$ | $CH_3$ | Veratrole, propionyl chloride, formic acid-acetic anhydride |
| 22 | (23) | H | $C_6H_5$ | $CH_3$ | $CH_3$ | Veratrole, benzoyl chloride, formic acid-acetic anhydride |
| 23 | (24) | H | $C_6H_5CH_2$ | $CH_3$ | $CH_3$ | Veratrole, phenylacetyl chloride, formic acid-acetic anhydride |
| 24 | (25) | H | $C_6H_5CH_2CH_2$ | $CH_3$ | $CH_3$ | Veratrole, 3-phenylpropionyl chloride, formic acid-acetic anhydride |
| 25 | (26) | $CH_3$ | $C_6H_5$ | $CH_3$ | $CH_3$ | Veratrole, benzoyl chloride, acetic anhydride |
| 26 | (27) | H | p-Cl—$C_6H_4CH_2$ | $CH_3$ | $CH_3$ | Veratrole, p-chlorophenylacetyl chloride, formic acid acetic anhydride |
| 27 | (28) | $(CH_3)_2CHCH_2CH_2$ | H | $CH_3$ | $CH_3$ | Veratrole, isocaproyl chloride, acetic anhydride |
| 28 | (29) | $n-C_4H_9$ | p-Br-$C_6H_4$— | $CH_3$ | $CH_3$ | Veratrole, p-bromobenzoyl chloride, valeryl chloride |
| 29 | (30) | $C_2H_5$ | H | $n-C_3H_7$ | $n-C_3H_7$ | 4-Chloro-2-ethyl-6,7-dipropyloxyquinazoline |
| 30 | (31) | $CH_3$ | H | $(CH_3)_2CHCH_2$ | $(CH_3)_2CHCH_2$ | 4-Chloro-2-methyl-6,7-diiosbutyoxyquinazoline |
| 31 | (33) | $CH_3$ | $CH_3O$ | $CH_3$ | $CH_3$ | 4-Chloro-6,7-dimethoxy-2-methylquinazoline, sodium methoxide |
| 32 | (34) | $(CH_3)_2CHCH_2$ | $CH_3O$ | $n-C_3H_7$ | $n-C_3H_7$ | 4-Chloro-6,7-dipropyloxy-2-isobutyoxyquinazoline, sodium methoxide |

TABLE I—Continued
Additional Quinazolines Prepared by Adaptation of Procedures 1 to 8 and Reactants Therefor

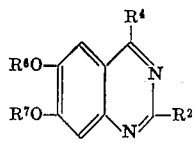

| Procedure | Ex. No. Reference | $R^2$ | $R^4$ | $R^6$ | $R^7$ | Reactants |
|---|---|---|---|---|---|---|
| 33 | (35) | $CH_3$ | $(CH_3)_2CHCH_2O$ | $CH_3$ | $CH_3$ | 4-Chloro-6,7-dimethoxy-2-methoxyquinazoline, sodium isopentoxide |
| 34 | (36) | $CH_3$ | $-C \equiv N$ | $CH_3$ | $CH_3$ | 4-Chloro-6,7-dimethoxy-2-methyquinazoline, sodium cyanide |
| 35 | (37) | $(CH_3)_2CHCH_2$ | $-C \equiv N$ | $CH_3$ | $CH_3$ | 4-Chloro-6,7-dimethoxy-2-isobutoxyquinazoline, sodium cyanide |
| 36 | (38) | $(CH_3)_2CHCH_2$ | $-C \equiv N$ | $n\text{-}C_3H_7$ | $n\text{-}C_3H_7$ | 4-Chloro-6,7-diisopropyloxy-2-isobutyoxyquinazoline, sodium cyanide |
| 37 | (39) | H | $NH\text{-}n\text{-}C_4H_9$ | $CH_3$ | $CH_3$ | 4-Chloro-6,7-dimethoxy-quinazoline, n-butylamine |
| 38 | (40) | H | $NH_2$ | $n\text{-}C_3H_7$ | $n\text{-}C_3H_7$ | 4-Chloro-6,7-dipropyloxy-quinazoline, ammonia |
| 39 | (41) | $C_2H_5$ | $NH_2$ | $CH_3$ | $CH_3$ | 4-Chloro-6,7-dimethoxy-2-ethylquinazoline, ammonia |
| 40 | (42) | $n\text{-}C_3H_7$ | $NH_2$ | $CH_3$ | $CH_3$ | 4-Chloro-6,7-dimethoxy-2-n-propylquinazoline, ammonia |
| 41 | (43) | $i\text{-}C_3H_7$ | $NH_2$ | $CH_3$ | $CH_3$ | 4-Chloro-6,7-dimethoxy-2-isopropylquinazoline, ammonia |
| 42 | (44) | $tert.\text{-}C_4H_9$ | $NH_2$ | $CH_3$ | $CH_3$ | 4-Chloro-6,7-dimethoxy-2-ammonia |
| 43 | (45) | H | $NH_2$ | methylenedioxy | | 4-Chloro-6,7-methylenedioxy-quinazoline, ammonia |
| 44 | (46) | H | $NH\text{-}n\text{-}C_3H_7$ | methylenedioxy | | 4-Chloro-2-methyl-6,7-methylenedioxyquinazoline, n-propylamine |

While several specific embodiments are disclosed in the foregoing specification, it will be appreciated that other modifications may be made without departing from the spirit and scope of the appended claims.

What is claimed is:

1. A process for preventing aggregation of blood platelets in a mammal having a thromboembolic condition which comprises administering to said mammal an

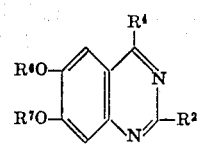

antithrombogenic effective dose of a quinazoline to provide a blood level of from 0.5 to 80 micrograms of said quinazoline per 0.5 milliliter blood, said quinazoline being selected from the group consisting of the compounds having the formula
wherein
$R^2$ is hydrogen or lower alkyl having from one to five carbon atoms inclusive,
$R^4$ is hydrogen, lower alkyl from one to five carbon atoms inclusive, amino, lower alkylamino from one to four carbon atoms inclusive, lower alkoxy from one to four carbon atoms inclusive, cyano, phenyl, benzyl, phenethyl, and halogen monosubstituted p-henyl, benzyl and phenethyl;
$R^6$ and $R^7$ are lower alkyl from one to five carbon atoms inclusive; $R^6O$ and $R^7O$ taken together form the methylenedioxy group; and the non-toxic pharmaceutically acceptable acid addition salts thereof.

2. The process as claimed in claim 1 employing 4-amino-6,7-dimethoxyquinazoline.

3. The process as claimed in claim 1 employing 4-amino-6,7-dimethoxyquinazoline hydrochloride.

4. The process as claimed in claim 1 employing 6,7-dimethoxy-4-methylaminoquinazoline.

5. The process as claimed in claim 1 employing 6,7-dimethoxy-4-methylaminoquinazoline hydrochloride.

6. The process as claimed in claim 1 employing 6,7-dimethoxy-4-ethylquinazoline.

7. The process as claimed in claim 1 employing 6,7-dimethoxyquinazoline.

8. The process as claimed in claim 1 employing 6,7-dimethoxy-4-ethyl-2-methylquinazoline.

9. The process as claimed in claim 1 employing 6,7-dimethoxy-4-methylquinazoline.

10. The process as claimed in claim 1 employing 6,7-dimethoxy-4-isopentylquinazoline.

11. The process as claimed in claim 1 employing 6,7-dimethoxy-4-isopentyl-2-methylquinazoline.

12. The process as claimed in claim 1 employing 1-benzyl-6,7-dimethoxyquinazoline.

13. A process for preventing aggregation of blood platelets in a mammal having a thromboembolic condition which comprises administering to said mammal an antithrombogenic effective dose of 4-cyanoquinazoline to provide a blood level of from 0.5 to 80 micrograms per 0.5 milliliter of blood.

* * * * *

UNITED STATES PATENT OFFICE
CERTIFICATE OF CORRECTION

Patent No. 3,800,039               Dated March 26, 1974

Inventor(s) NORMAN R. MARQUIS and ROGER L. VIGDAHL

It is certified that error appears in the above-identified patent and that said Letters Patent are hereby corrected as shown below:

Column 2, line 28, change "-dimethylpropyl," to --addition--.

Column 6, line 22, change "a Lineal-Log" to --a Beckman--.

Column 12, line 22, before "8.16" insert --H--.

IN THE CLAIMS:

Claim 1, line 40, the structural formula should be deleted and reinserted after "compounds having the formula".

Claim 12, line 55, "employing 1" should be --employing 4--.

Signed and sealed this 10th day of September 1974.

(SEAL)
Attest:

McCOY M. GIBSON, JR.            C. MARSHALL DANN
Attesting Officer                Commissioner of Patents